(12) United States Patent
Chao

(10) Patent No.: US 7,405,765 B2
(45) Date of Patent: Jul. 29, 2008

(54) METHOD AND APPARATUS FOR DE-INTERLACING VIDEO DATA

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 531 days.

(21) Appl. No.: 10/907,154

(22) Filed: Mar. 23, 2005

(65) Prior Publication Data

US 2005/0212960 A1 Sep. 29, 2005

(30) Foreign Application Priority Data

Mar. 24, 2004 (TW) ............................. 93108018 A

(51) Int. Cl.
*H04N 7/01* (2006.01)

(52) U.S. Cl. .................... 348/448; 348/452; 348/451; 348/700; 348/701

(58) Field of Classification Search ................ 348/452, 348/448, 451, 459, 620, 699, 700, 701; 382/236; 375/240.16
See application file for complete search history.

(56) References Cited

U.S. PATENT DOCUMENTS

| | | | |
|---|---|---|---|
| 5,410,356 A * | 4/1995 | Kikuchi et al. | 348/452 |
| 5,483,288 A * | 1/1996 | Hong | 348/448 |
| 5,521,644 A * | 5/1996 | Sezan et al. | 348/452 |
| 5,532,751 A | 7/1996 | Lui | |
| 5,796,437 A * | 8/1998 | Muraji et al. | 348/452 |
| 6,014,182 A | 1/2000 | Swartz | |
| 6,034,734 A * | 3/2000 | De Haan et al. | 348/458 |
| 6,133,957 A | 10/2000 | Campbell | |
| 6,201,577 B1 | 3/2001 | Swartz | |
| 6,295,091 B1 | 9/2001 | Huang | |
| 6,330,032 B1 | 12/2001 | Boehlke | |
| 6,421,090 B1 | 7/2002 | Jiang et al. | |
| 6,512,550 B1 | 1/2003 | de Garrido et al. | |
| 6,577,345 B1 | 6/2003 | Lim et al. | |
| 6,580,436 B1 | 6/2003 | Hishida et al. | |
| 6,606,126 B1 | 8/2003 | Lim et al. | |
| 7,116,372 B2 * | 10/2006 | Kondo et al. | 348/448 |
| 7,142,247 B2 * | 11/2006 | Jung | 348/452 |
| 7,170,562 B2 * | 1/2007 | Yoo et al. | 348/452 |

* cited by examiner

*Primary Examiner*—David Ometz
*Assistant Examiner*—Jean W Désir
(74) *Attorney, Agent, or Firm*—Winston Hsu

(57) ABSTRACT

The invention relates to a method and an apparatus for de-interlacing video data by utilizing motion compensation. The method includes performing an operation of motion estimation on a first pixel of the first field and a second target field to generate a first motion vector, wherein the second target field corresponds to the second field; generating a first reference pixel corresponding to the first pixel according to the first motion vector and the second field; and generating a target pixel of a target frame according to the first pixel and the first reference pixel.

19 Claims, 4 Drawing Sheets

METHOD AND APPARATUS FOR DE-INTERLACING VIDEO DATA

BACKGROUND OF INVENTION

1. Field of the Invention

The present invention relates to video system, and more specifically, to a method and an apparatus for de-interlacing video data.

2. Description of the Prior Art

In conventional interlaced scanning, a frame is composed of two fields, which are an odd field composed of odd scan lines, and an even field composed of even scan lines.

In progressive scanning (non-interlaced scanning), an odd field and an even field are combined into one frame, and then the frame is scanned at double horizontal scan frequency in sequence, so that the quality of the image (frame) is improved.

Before combining two fields into one frame, it is necessary to detect the relationship between each field in the video data. This means it is necessary to detect whether the video data is a film mode, for example, and whether the video data is 3-2 pull down or 2-2 pull down. Then, the video data is appropriately de-interlaced according to result of the film mode detection. According to the prior art, the operation of de-interlacing is simply implemented with operations of intra-field interpolation, inter-field interpolation or motion-adaptive process, like the methods disclosed in U.S. Pat. No. 6,577,345 and U.S. Pat. No. 6,512,550.

However, it is an important task to decrease the errors that appear when determining the pixel values, in order to enhance the quality of de-interlaced images (frames) or lower the costs on the related hardware.

SUMMARY OF INVENTION

It is therefore one of the objectives of the claimed invention to provide a method and an apparatus for de-interlacing video data by utilizing motion compensation.

According to the claimed invention, a method is disclosed for de-interlacing video data. The video data comprises a first field and a second field which is previous to the first field. The method comprises: estimating a motion between a first pixel of the first field and a second target field to generate a first motion signal, wherein the second target field is generated according to the second field; generating a first reference pixel corresponding to the first pixel according to the first motion signal and the second field; and generating a target pixel of a first target frame according to the first pixel and a motion compensation pixel, wherein the motion compensation pixel is generated according to the first reference pixel.

According to the claimed invention, an apparatus for de-interlacing video data is disclosed. The video data comprises a first field and a second field which is previous to the first field. The apparatus comprises: a first motion estimator utilized for estimating a motion between a first pixel of the first field and a second target field to generate a first motion signal, wherein the second target field is generated according to the second field; a first pixel choosing unit utilized for generating a first reference pixel corresponding to the first pixel according to the first motion signal and the second field; and a combining module utilized for generating a target pixel of a first target frame according to the first pixel and a motion compensation pixel, wherein the motion compensation pixel corresponds to the first reference pixel.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
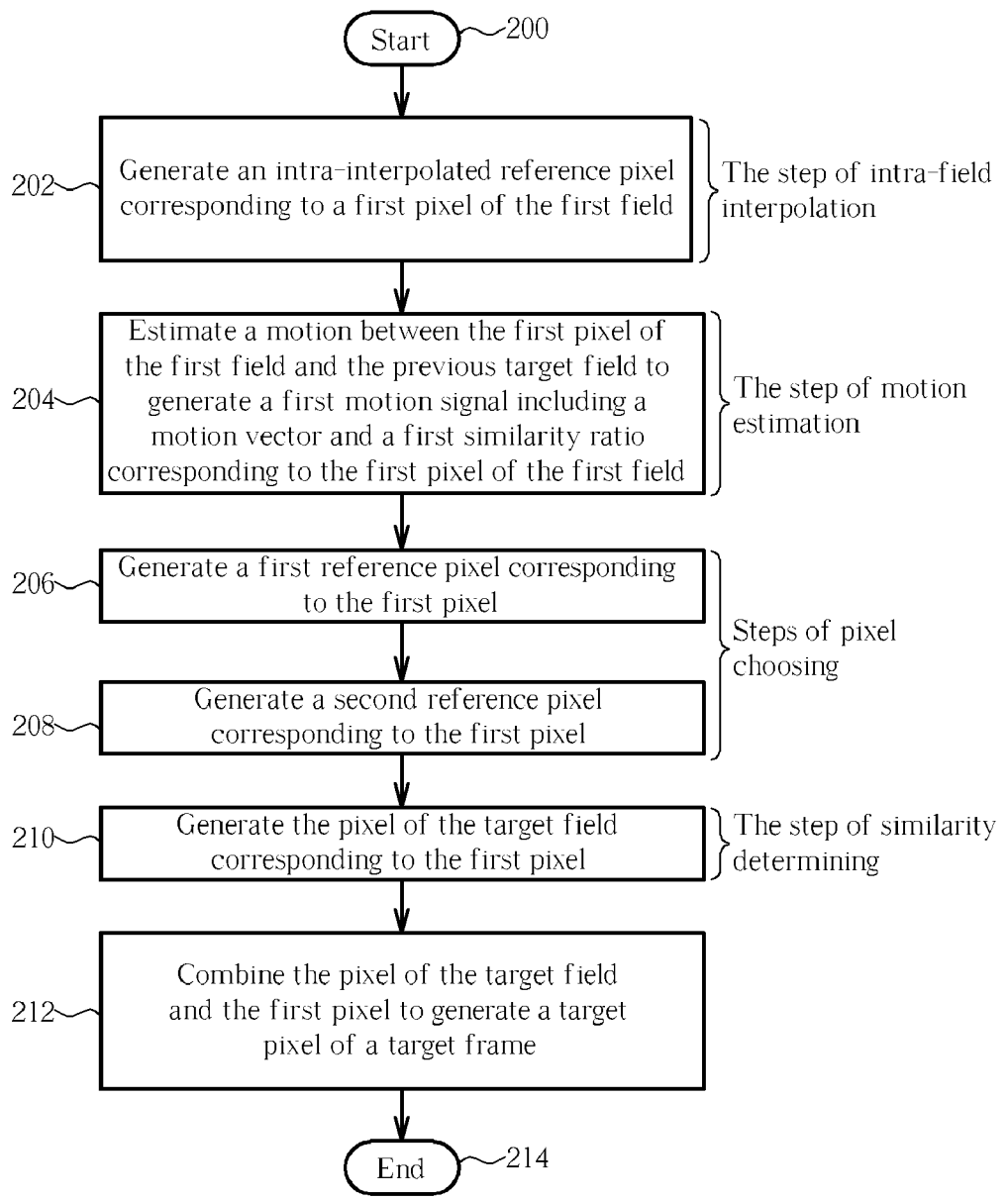
FIG. 1 is a flowchart of a method for de-interlacing video data according to a first embodiment of the present invention.
Figure 2:
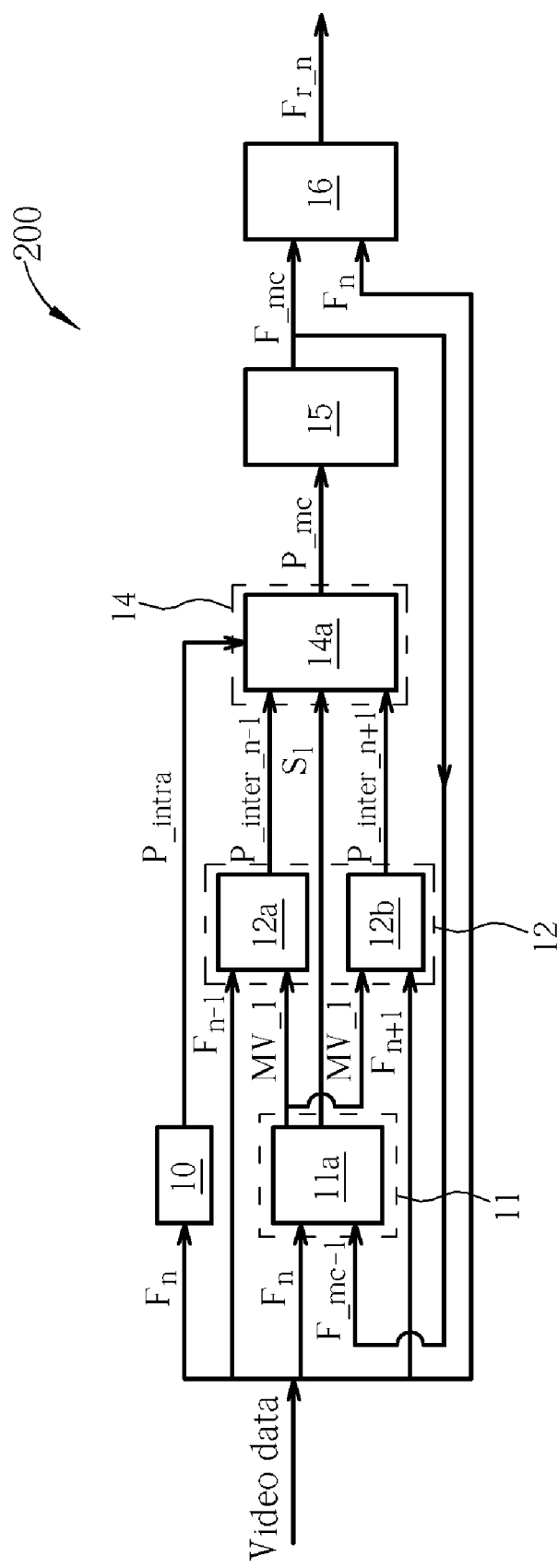
FIG. 2 is a functional diagram of a video data de-interlacing circuit according to the first embodiment of the present invention.

FIG. 1 is a flowchart of a method for de-interlacing video data utilizing motion compensation according to a first embodiment of the present invention. The method comprises receiving three adjacent fields, a second field $F_{n-1}$, a first field $F_n$ and a third field $F_{n+1}$, respectively from the video data. The second field $F_{n-1}$ is previous to the first field $F_n$, and the first field $F_n$ is previous to the third field $F_{n+1}$. FIG. 2 is a functional diagram of a de-interlacing circuit 200 according to the first embodiment of the present invention. The de-interlacing circuit 200 comprises an intra-field interpolator 10, a motion estimator 11, a pixel choosing module 12, a determining module 14, a buffer 15 and a field combining module 16. The motion estimator 11 comprises a motion estimating unit 11a. The pixel choosing module 12 comprises pixel choosing units 12a and 12b. The determining module 14 comprises a determining unit 14a. The flow of the operation of the first embodiment is described in the following:

Step 202 (the step of intra-field interpolation): The intra-field interpolator 10 receives the first field $F_n$ and generates an intra-interpolated reference pixel P_intra corresponding to a first pixel of the first field $F_n$. The intra-field interpolator 10 of the embodiment can be a conventional intra-field interpolator;

Step 204 (the step of motion estimation): The motion estimator 11a receives the first field $F_n$ and a previous target field F_mc−1 and estimates a motion between the first pixel of the first field $F_n$ and the previous target field F_mc−1 to generate a first motion signal including a motion vector MV__1 and a first similarity ratio $S_1$ corresponding to the first pixel of the first field $F_n$. Wherein, the first motion vector MV__1 represents the amount of motion between the first pixel and the possible corresponding pixel P_mc−1 of the previous target field F_mc−1. If the first motion vector MV__1 is 0, it means there is no motion between the first pixel and the possible corresponding pixel P_mc−1. The first similarity ratio $S_1$ represents the similarity between the first pixel and the possible corresponding pixel P_mc−1 of the previous target field F_mc−1. In an embodiment, a subtraction operation is performed between the first pixel and the possible corresponding pixel to get a difference value in order to get the first similarity ratio $S_1$. The bigger the difference value, the smaller the first similarity ratio $S_1$; the smaller the difference value, the bigger the first similarity ratio $S_1$;

Steps 206 and 208 are steps of pixel choosing:

Step 206: The pixel choosing unit 12a generates a first reference pixel P_inter_n−1 corresponding to the first pixel according to the first motion vector MV__1 and the second field $F_{n-1}$;

Step 208: The pixel choosing module unit generates a second reference pixel P_inter_n+1 corresponding to the first pixel according to the first motion vector MV__1 and the third field $F_{n+1}$;

Step 210 (the step of similarity determining): The determining unit 14a adjusts the weights of the reference pixels (including P_intra, P_inter_n−1, and P_inter_n+1) according to the first similarity ratio $S_1$ to generate the pixel P_mc of the target field F_mc corresponding to the first pixel. In an embodiment, P_mc=$w_1$×P_inter+(1−$w_1$)×P_intra, wherein P_inter=(½)×(P_inter_n−1+P_inter_n+1), and $w_1$ is corresponding to the first similarity ratio $S_1$;

Step 212: The buffer 15 is for temporarily storing the pixel P_mc of the target field F_mc. The field combining module 16 combines the pixel P_mc and the first pixel to generate a target pixel of a target frame Fr_n; and Step 214: End.

In another embodiment, the intra-interpolated reference pixel P_intra can be omitted, so the step 202 can be ignored. In another embodiment, the second reference pixel P_inter_n+1 can be omitted, so the step 208 can be ignored. In another embodiment, the reference pixel P_intra and P_inter_n+1 can be omitted, so the steps 202, 208 and 210 can be ignored.

If the first field $F_n$ is an odd field, the target field F_mc is an even field; if the first field $F_n$ is an even field, the target field F_mc is an odd field.

Figure 3:
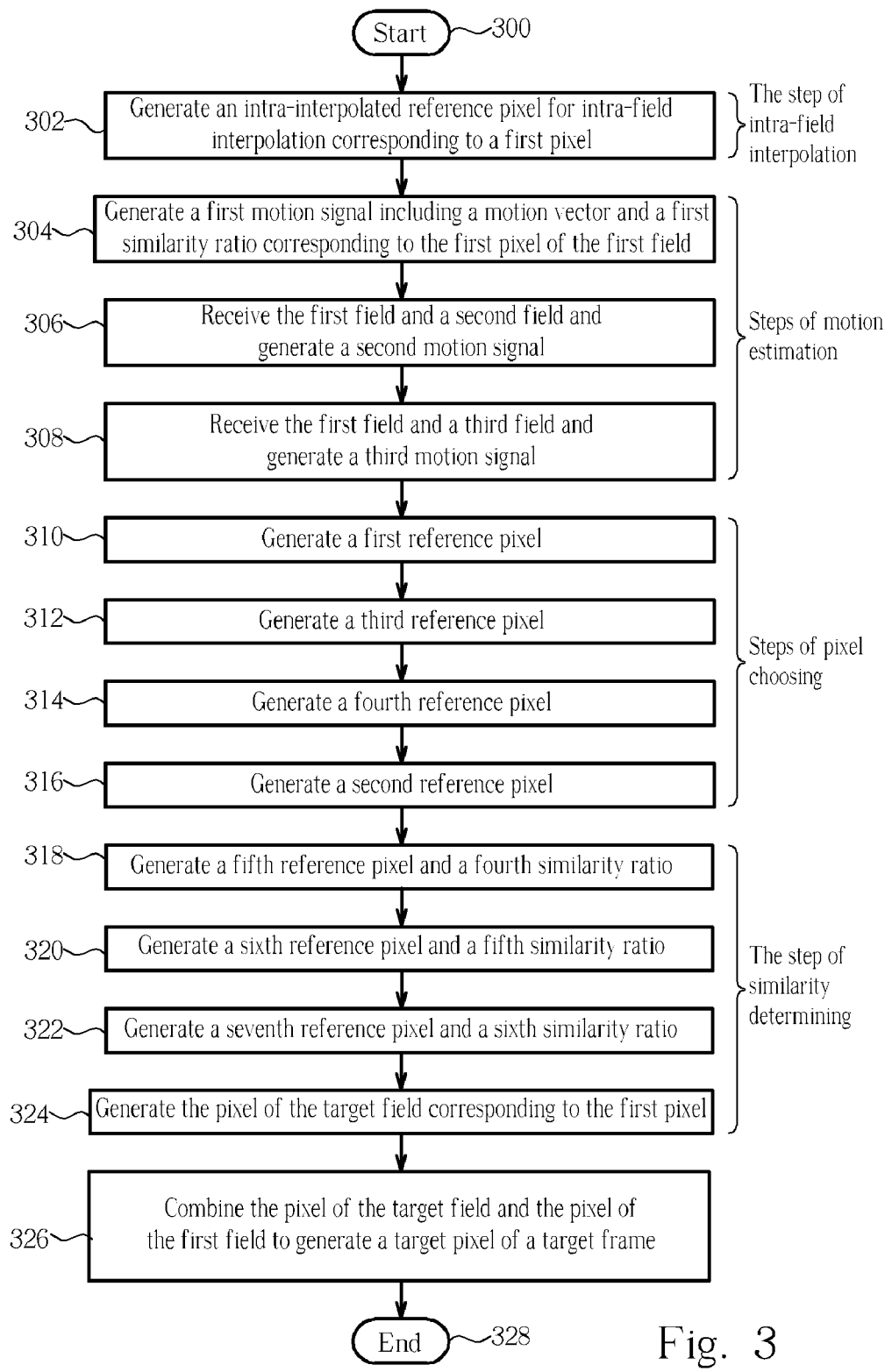
FIG. 3 is a flowchart of a method for de-interlacing video data according to a second embodiment of the present invention.
Figure 4:
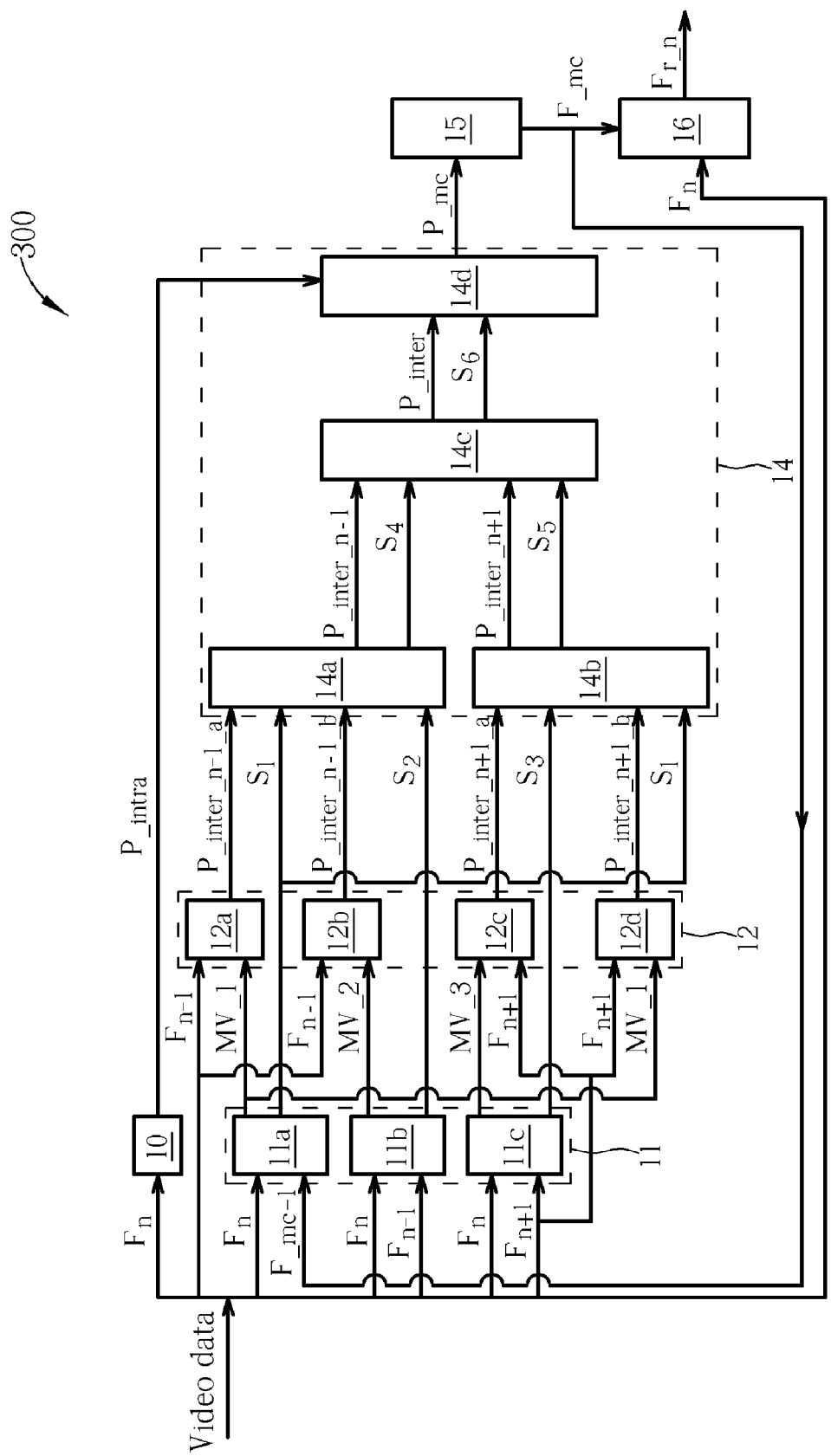
FIG. 4 is a functional diagram of a video data de-interlacing circuit according to the second embodiment of the present invention.

FIG. 3 is a flowchart of a method for de-interlacing according to the present invention. The method comprises receiving a second field $F_{n-1}$, a first field $F_n$ and a third field $F_{n+1}$. The second field $F_{n-1}$ is previous to the first field $F_n$, and the first field $F_n$ is previous to the third field $F_{n+1}$. FIG. 4 is a functional diagram of a de-interlacing circuit 300 according to the present invention. The circuit 300 comprises an intra-field interpolator 10, a motion estimator 11, a pixel choosing module 12, a determining module 14, a buffer 15 and a field combining module 16. Wherein, the motion estimator 11 comprises motion estimating units, 11a, 11b and 11c. The pixel choosing module 12 comprises pixel choosing units 12a, 12b, 12c and 12d. The determining module 14 comprises determining units 14a, 14b, 14c and 14d. Please refer to FIG. 3 and FIG. 4. The flow of the operation of the second embodiment is described in the following:

Step 302 is the same as the step 202;

Steps 304, 306 and 308 are steps of motion estimation:

Step 304: is substantially the same as the step 204;

Step 306: The motion estimating unit 11b receives the first field $F_n$ and a second field $F_{n-1}$ and generates a second motion signal;

Step 308: The motion estimating unit 11c receives the first field $F_n$ and a third field $F_{n+1}$ and generates a third motion signal;

Steps 310, 312, 314 and 316 are steps of pixel choosing:

Step 310: The pixel choosing unit 12a generates a first reference pixel P_inter_n−1_a according to the first motion vector MV__1 and the second field $F_{n-1}$;

Step 312: The pixel choosing unit 12b generates a third reference pixel P_inter_n−1_b according to the second motion vector MV__2 and the second field $F_{n-1}$;

Step 314: The pixel choosing unit 12c generates a fourth reference pixel P_inter_n−1_a according to the third motion vector MV__3 and the third field $F_{n+1}$;

Step 316: The pixel choosing unit 12d generates a second reference pixel P_inter_n+1_b according to the first motion vector MV__1 and the third field $F_{n+1}$;

Steps 318, 320, 322 and 324 are steps of similarity determining:

Step 318: The determining unit 14a adjusts the weights of the reference pixels (being the first reference pixel P_inter_n−1_a and the third reference pixel P_inter_n−1_b) according to the first similarity ratio $S_1$ and the second similarity ratio $S_2$. $w_1$ is the weight of the first reference pixel P_inter_n−1_a. The determining unit 14a also generates a fifth reference pixel P_inter_n−1 and a fourth similarity ratio $S_4$ according to the weight of the first reference pixel P_inter_n−1_a, $w_1$. In an embodiment, $S_4$=$w_1$×$S_1$+(1−$w_1$)×$S_2$, P_inter_n−1=$w_1$×P_inter_n−1_a+(1−$w_1$)×P_inter_n−1_b;

Step 320: The determining unit 14b adjusts the weights of the reference pixels (being the fourth reference pixel P_inter_n+1_a and the second reference pixel P_inter_n+1_b) according to the first similarity ratio $S_1$ and the third similarity ratio $S_3$ to generate a sixth reference pixel P_inter_n+1 and a fifth similarity ratio $S_5$;

Step 322: The determining unit 14c adjusts the weights of the reference pixels (being the fifth reference pixel P_inter_n−1 and the sixth reference pixel P_inter_n+1) according to the fourth similarity ratio $S_4$ and the fifth similarity ratio $S_5$ to generate a seventh reference pixel P_inter and a sixth similarity ratio $S_6$;

Step 324: The determining unit 14d adjusts the weights of the reference pixels (being the reference pixel for intra-field interpolation P_intra and the seventh reference pixel P_inter) according to the sixth similarity ratio $S_6$. $w_6$ is the weight of the seventh reference pixel P_inter. The determining unit 14d also generates the pixel P_mc of the target field F_mc corresponding to the first pixel according to the weight of the seventh reference pixel P_inter, $w_6$. In the embodiment, P_mc=$w_6$×P_inter+(1−$w_6$)×P_intra;

Step 326: The buffer 15 temporarily stores the pixel P_mc of the target field F_mc. The field combining module 16 combines the pixel P_mc of the target field F_mc and the first pixel of the first field $F_n$ to generate a target pixel of a target frame Fr_n.

Certainly, part of the above-mentioned steps can be omitted. For example, the step 302 and/or part of the steps of motion estimation and/or part of the steps of pixel choosing and/or part of the steps of similarity determining can be omitted.

In an embodiment, the description of the determining function of the determining unit 14a is described as follows. When the first similarity ratio $S_1$ and the second similarity ratio $S_2$ are both bigger than a threshold value, P_inter_n−1=$w_1$×P_inter_n−1_a+(1−$w_1$)×P_inter_n−1_b. Wherein, weight $w_1$=($S_1$/($S_1$+$S_2$)). If the first similarity ratio $S_1$ is bigger than the threshold value and the second similarity ratio $S_2$ is smaller than the threshold value, P_inter_n−1=P_inter_n−1_a. Additionally, the fourth similarity ratio $S_4$ can be obtained by the above-mentioned determining function. The determining function of the determining units 14b, 14c and 14d are substantially the same.

In an embodiment, the previous target field corresponding to the previous field is utilized for assisting to make the target field correspond to the present processing field. Therefore, the above-mentioned operation flow can be used to compute and generate a plurality of target fields respectively corresponding to a plurality of fields of the video data, and finally the goal of de-interlacing the video data is reached. In the second embodiment, three fields, $F_{n-1}$, $F_n$, $F_{n+1}$, are utilized for predicting other possible reference pixels of each pixel of a target field (eg: P_inter_n+1_a and P_inter_n+1_b). Hence, when performing the following operations of weight blending to get the pixel value of each pixel of the target field, in the present embodiment, the better result of operation can be obtained to avoid a situation in which the pixel values of the inappropriate reference possible pixels affect the pixel values of the actual pixels.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for de-interlacing an interlaced image comprising previous, current, and next fields to generate a progressive image, the apparatus comprising:
   a first motion estimator utilized for estimating a motion between the current filed of the interlaced image and a corresponding compensation field of a compensation image to generate a first motion signal;
   an intra-field interpolation generator utilized for generating an intra-field interpolation pixel by using pixels in the current field;
   a pixel choosing module utilized for generating at least one of reference pixel according to the at least one of the previous and the next fields and the first motion signal;
   a determined module utilized, for generating a compensation field of the compensated image according to the intra-field interpolation pixel, the at least one of reference pixel, and the first motion signal; and
   a combining circuit utilized for combining the compensated field of the compensated image and the current field of the interlaced image to output the progressive image.

2. The apparatus of claim 1, wherein the pixel choosing module further comprises:
   a first pixel choosing unit utilized for generating a first reference pixel according to the first motion signal and the previous field; and
   a second pixel choosing unit utilized for generating a second reference pixel according to the first motion signal and the next field.

3. The apparatus of claim 2, further comprising:
   a second motion estimator utilized for estimating a motion between the current field and the previous field to generate a second motion signal; and
   a third motion estimator utilized for estimating a motion between the current field and the next field to generate a third motion signal.

4. The apparatus of claim 3, wherein the pixel choosing module further comprises:
   a third pixel choosing unit utilized for generating a third reference pixel according to the second motion signal and the previous field; and
   a fourth pixel choosing unit utilized for generating a fourth reference pixel according to the third motion signal and the next field.

5. The apparatus of claim 4, wherein determined module generates the compensation pixel of the field of the compensated image according to the intra-field interpolation pixel, the first, the second, the third, and the fourth reference pixels, and the first, the second, and the third motion signals.

6. The apparatus of claim 1, further comprising:
   a second motion estimator utilized for estimating a motion between the current field and the previous field to generate a second motion signal; and
   a third motion estimator utilized for estimating a motion between the current field and the next field to generate a third motion signal.

7. The apparatus of claim 6, wherein the pixel choosing module further comprises:
   a first pixel choosing unit utilized for generating a first reference pixel according to the first motion signal and the previous field;
   a second pixel choosing unit utilized for generating a second reference pixel according to the first motion signal and the next field;
   a third pixel choosing unit utilized for generating a third reference pixel according to the second motion signal and the previous field; and
   a fourth pixel choosing unit utilized for generating a fourth reference pixel according to the third motion signal and the next field.

8. The apparatus of claim 7, wherein determined module generates the compensation pixel of the field of the compensated image according to the intra-field interpolation pixel, the first, the second, the third, and the fourth reference pixels, and the first, the second, and the third motion signals.

9. The apparatus of claim 7, wherein the determining unit adjusts weights of the reference and the intra-field interpolation pixels according to at least one of the motion signals to generate the compensation field of the compensated image.

10. The apparatus of claim 1, wherein when the current field is an odd field, the corresponding compensation field is an even field, when the current field is an even field, the corresponding compensation field is an odd field.

11. A method for de-interlacing an interlaced image comprising previous, current, and next fields to generate a progressive image, comprising:
    estimating a motion between the current filed of the interlaced image and a corresponding compensation field of a compensation image to generate a first motion signal;
    generating an intra-field interpolation pixel by using pixels in the current field;
    generating at least one of reference pixels according to the at least one of the previous and the next fields and the first motion signal;
    determining a weighted value according to the first motion signal;
    generating a compensation field of the compensated image according to the intra-field interpolation pixel, the at least one of reference pixel, and the weighted value; and
    combining the compensated field and the current field to output the progressive image.

12. The method of claim 11, wherein the step of generating at least one of reference pixels further comprises:
    generating a first reference pixel according to the first motion signal and the previous field; and
    generating a second reference pixel according to the first motion signal and the next field.

13. The method of claim 12, further comprising:
    estimating a motion between the current field and the previous field to generate a second motion signal; and
    estimating a motion between the current field and the next field to generate a third motion signal.

14. The method of claim 13, wherein the step of generating at least one of reference pixels further comprises:
    generating a third reference pixel according to the second motion signal and the previous field; and
    generating a fourth reference pixel according to the third motion signal and the next field.

15. The method of claim 14, wherein the weighted value is determined according to the first, the second, and the third motion signals.

16. The method of claim 13, wherein each of the first, the second, and the third motion signals comprises a motion vector and a similarity ratio.

17. The method of claim 11, further comprising:
estimating a motion between the current field and the previous field to generate a second motion signal; and
estimating a motion between the current field and the next field to generate a third motion signal.

18. The apparatus of claim 17, wherein the step of generating at least one of reference pixels further comprises:
generating a first reference pixel according to the first motion signal and the previous field;
generating a second reference pixel according to the first motion signal and the next field;
generating a third reference pixel according to the second motion signal and the previous field; and
generating a fourth reference pixel according to the third motion signal and the next field.

19. The method of claim 18, wherein the weighted value is determined according to the first, the second, and the third motion signals.

* * * * *